3,153,091
PROCESS FOR THE PRODUCTION OF CYCLOHEXANONE OXIME
Ollie W. Chandler, Terre Haute, Ind., assignor to Commercial Solvents Corporation, New York, N.Y., a corporation of Maryland
No Drawing. Filed Nov. 29, 1961, Ser. No. 155,847
14 Claims. (Cl. 260—566)

My invention relates to the production of cyclohexanone oxime. More particularly my invention relates to the production of cyclohexanone oxime by the oxidation of cyclohexylhydroxylamine.

Cyclohexanone oxime, an intermediate used in the preparation of caprolactam, is prepared by the reduction of nitrocyclohexane in the presence of a suitable reduction catalyst. Such processes and catalysts are shown in U.S. Patents 2,711,427; 2,768,206; 2,886,596; and copending U.S. patent application Serial No. 113,625 by Vernon V. Young, filed May 31, 1961. Generally these procedures consist of catalytically hydrogenating nitrocyclohexane under pressures ranging from about 300 to about 1,000 p.s.i. at temperatures ranging from about 50 to about 150° C. in the presence of an inert organic solvent such as a lower alcohol. In all known reduction procedures, however, conversion of nitrocyclohexane to cyclohexanone oxime is not quantitative. Besides cyclohexanone oxime, the reaction mixture also contains other products in major amounts such as cyclohexylhydroxylamine. Because of the economics involved in the multi-step production of caprolactam, it is necessary to obtain maximum utilization of all starting and intermediate materials It has therefore been recommended that cyclohexylhydroxylamine can be converted by catalytic oxidation to cyclohexanone oxime. Such a procedure is described in U.S. Patent 2,886,596, to Herbert Meister and Walter Franke. Generally this procedure consists of oxidizing, by a batch procedure, cyclohexylhydroxylamine contained in a solvent medium utilizing an oxidation catalyst such as palladium or platinum. While this procedure is reasonably satisfactory, the maximum theoretical yields of cyclohexanone oxime are not approached and in addition, significant amounts of unwanted azoxycyclohexane are produced.

I have now discovered an improved process whereby cyclohexanone oxime can be produced by the catalytic oxidation of cyclohexylhydroxylamine. My process is not only economical and efficient but produces cyclohexanone oxime in yields approaching the theoretical maximum without concurrent production of azoxycyclohexane.

Generally my procedure consists of incrementally contacting cyclohexylhydroxylamine with an oxygen source such as pure oxygen or air in the presence of an oxidation catalyst at such a rate so that the cyclohexylhydroxylamine is immediately converted to cyclohexanone oxime.

In carrying out my invention, I generally prefer to incrementally add the cyclohexylhydroxylamine to an inert solvent medium containing an oxidation catalyst in the presence of an oxygen source at temperatures ranging from about 0 to about 135° C. at a rate such that the cyclohexylhydroxylamine is immediately converted to cyclohexanone oxime and no cyclohexylhydroxylamine is present as such at any time in the solvent medium.

Any suitable oxidation catalyst such as palladium, platinum, or zinc chromite can be utilized. However, I prefer to use the silver oxide, zinc oxide, chromium oxide, calcium oxide catalyst described in copending patent application U.S. Serial No. 113,625 by Vernon V. Young, filed May 31, 1961. This catalyst is prepared by calcinating a silver-containing compound such as silver acetate or silver oxide with a zinc-containing compound such as zinc acetate, a chromium-containing compound such as chromium oxide, and a calcium-containing compound such as calcium oxide. More specifically, the catalyst is prepared by making a slurry of the oxides and/or acetates of silver, zinc, chromium, and calcium with acetic acid and water, thoroughly mixing the said slurry, and evaporating it to dryness. The dried slurry is then calcined at temperatures of from about 250° C. to about 400° C. to give a fused residue. This fused residue is then triturated with a small amount of acetic acid and then washed with a small amount of water. The thus prepared catalyst is then dried at about 110° C. The catalyst can then be activated by heating it at a high temperature such as approximately 450° C.

In carrying out my process I can employ an inert organic solvent. Suitable solvents which I can utilize include methanol, ethanol, isopropanol, ether, etc. I prefer to use methanol.

In order to obtain maximum yields of cyclohexanone oxime, the cyclohexylhydroxylamine should be added to an oxidation zone containing the inert solvent at such a rate so that immediate conversion of cyclohexylhydroxylamine to cyclohexanone oxime is accomplished. To best obtain this result it is preferable to slowly add measured increments of cyclohexylhydroxylamine to the oxidation zone wherein is contained the inert solvent medium, the said solvent medium containing the catalyst while concurrently sparging the zone with oxygen or an oxygen-containing gas in order to permit immediate and total conversion to cyclohexanone oxime.

The following examples serve to illustrate my process. It is not intended, however, that my invention should be limited to the exact procedure, specific proportions, or particular reaction mixture set forth therein, for I intend to include all equivalents obvious to the art.

*Example I*

To a reaction vessel containing 100 cc. of methanol and 2 grams of silver oxide, zinc oxide, chromium oxide, calcium oxide catalyst prepared according to the procedure of U.S. patent application Serial No. 113,625 was added over a period of 3 hours and 20 minutes, a 200 cc. portion of a methanol solution containing 0.0350 mole of cyclohexylamine, 0.1040 mole of cyclohexylhydroxylamine, 0.0925 mole of cyclohexanone oxime, and 0.3094 mole of nitrocyclohexane at a rate of 1 cc. per minute. During the addition period the reaction zone was continuously sparged with oxygen and the temperature was maintained at about 60–65° C. Throughout the addition, no cyclohexylhydroxylamine was detected to be present in the methanol solution in the reactor. At the end of the addition period, 0.1885 mole of cyclohexanone oxime was obtained from the reaction mixture thus showing a yield of cyclohexanone oxime from cyclohexylhydroxylamine of 92.3%.

*Example II*

A 300 cc. portion of a methanol solution containing 0.0350 mole of cyclohexylamine, 0.1040 mole of cyclohexylhydroxylamine, 0.0925 mole of cyclohexanone oxime, 0.3094 mole of nitrocyclohexane, and 2 grams of the silver oxide, zinc oxide, chromium oxide, calcium oxide catalyst of the type utilized in Example I were sparged with oxygen for about 3½ hours during which period the temperature was maintained at about 55–60° C. At the end of the 3½ hour period, the reaction mixture contained 0.1667 mole of cyclohexanone oxime thus showing a yield of cyclohexanone oxime from cyclohexylhydroxylamine of 71.4%. A comparison of the results of the batch procedure utilized in Example II with the results of the incremental addition procedure utilized in Example I clearly demonstrates the ability of my process to produce cyclohexanone oxime from cyclohexylhydroxylamine in greatly improved yields.

*Example III*

The procedure of Example I was carried out with the exception that a palladium catalyst was utilized instead of the catalyst of Example I. Results similar to those shown in Example I were obtained.

*Example IV*

The procedure of Example I was carried out with the exception that a platinum catalyst was utilized instead of the catalyst utilized in Example I. Results similar to those shown in Example I were obtained.

Now having described my invention, what I claim is:

1. In a process for the production of cyclohexanone oxime by the catalytic oxidation of cyclohexylhydroxylamine in the presence of an inert solvent at temperatures ranging from about 0 to about 135° C., the improvement consisting of incrementally contacting cyclohexylhydroxylamine with an oxgenating agent selected from the group consisting of oxygen and oxygen-containing gas at such a rate that the cyclohexylhydroxylamine is immediately converted to cyclohexanone oxime.

2. In a process for the production of cyclohexanone oxime by the catalytic oxidation of cyclohexylhydroxylamine in the presence of an inert solvent at temperatures ranging from about 0 to about 135° C., the improvement consisting of incrementally adding cyclohexylhydroxylamine to the inert solvent medium in the presence of an oxygenating agent selected from the group consisting of oxygen and oxygen-containing gas at a rate so that the cyclohexylhydroxylamine is immediately converted to cyclohexanone oxime.

3. In a process for the production of cyclohexanone oxime by the catalytic oxidation of cyclohexylhydroxylamine in the presence of an inert solvent at temperatures ranging from about 0 to about 135° C., the improvement consisting of incrementally adding cyclohexylhydroxylamine to an oxidation zone containing an inert solvent and an oxidation catalyst at such a rate so that the cyclohexylhydroxylamine is immediately converted to cyclohexanone oxime.

4. In the process of claim 1 wherein the oxygenating agent is oxygen and the inert solvent is an inert organic solvent.

5. In the process of claim 4 wherein the inert organic solvent is selected from the group consisting of methanol, ethanol, isopropanol and ethyl ether.

6. In the process of claim 4 wherein the catalyst is selected from the group consisting of silver oxide-zinc oxide-chromium oxide-calcium oxide catalyst, palladium catalyst, platinum catalyst and zinc chromite catalyst.

7. In the process of claim 2 wherein the oxygenating agent is oxygen and the inert solvent is an inert organic solvent.

8. In the process of claim 7 wherein the inert organic solvent is selected from the group consisting of methanol, ethanol, isopropanol and ethyl ether.

9. In the process of claim 7 wherein the catalyst is selected from the group consisting of silver oxide-zinc oxide-chromium oxide-calcium oxide catalyst, palladium catalyst, platinum catalyst and zinc chromite catalyst.

10. In the process of claim 3 wherein the oxygenating agent is oxygen and the inert solvent is an inert organic solvent.

11. In the process of claim 10 wherein the inert organic solvent is selected from the group consisting of methanol, ethanol, isopropanol and ether.

12. In the process of claim 10 wherein the catalyst is selected from the group consisting of silver oxide-zinc oxide-chromium oxide-calcium oxide catalyst, palladium catalyst, platinum catalyst and zinc chromite catalyst.

13. In a process for the production of cyclohexanone oxime by the catalytic oxidation of cyclohexylhydroxylamine which comprises contacting cyclohexylhydroxylamine with an oxygen source in the presence of a silver oxide-zinc oxide-chromium oxide-calcium oxide catalyst in an inert organic solvent, the improvement consisting of incrementally contacting the cyclohexylhydroxylamine with the oxygen source at a rate so that the cyclohexylhydroxylamine is immediately converted to cyclohexanone oxime.

14. The process of claim 13 wherein the inert solvent is methanol.

References Cited in the file of this patent

UNITED STATES PATENTS

| | | |
|---|---|---|
| 2,829,163 | Joris et al. | Apr. 1, 1958 |
| 2,886,596 | Meister et al. | May 12, 1959 |
| 2,947,783 | Kahr et al. | Aug. 2, 1960 |